United States Patent
Kjille

(10) Patent No.: US 10,967,704 B2
(45) Date of Patent: Apr. 6, 2021

(54) CLIMATE SYSTEM FOR PROVIDING AIR TO A CAB OF A VEHICLE

(71) Applicant: VOLVO CONSTRUCTION EQUIPMENT AB, Eskilstuna (SE)

(72) Inventor: Jerker Kjille, Stora Sundby (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 137 days.

(21) Appl. No.: 16/095,389

(22) PCT Filed: May 30, 2016

(86) PCT No.: PCT/SE2016/050503
§ 371 (c)(1),
(2) Date: Oct. 22, 2018

(87) PCT Pub. No.: WO2017/209663
PCT Pub. Date: Dec. 7, 2017

(65) Prior Publication Data
US 2019/0126716 A1    May 2, 2019

(51) Int. Cl.
*B60H 1/00* (2006.01)
*E02F 9/08* (2006.01)
*B60H 1/32* (2006.01)

(52) U.S. Cl.
CPC ..... *B60H 1/00328* (2013.01); *B60H 1/00207* (2013.01); *B60H 1/00378* (2013.01); *B60H 1/32281* (2019.05); *E02F 9/0858* (2013.01); *B60H 2001/00228* (2013.01)

(58) Field of Classification Search
CPC ............ B60H 1/00328; B60H 1/32281; B60H 1/00378; B60H 2001/00228; B60H 2001/3485; E02F 9/0858

USPC .......................................................... 454/69
See application file for complete search history.

(56) References Cited

U.S. PATENT DOCUMENTS

| | | | |
|---|---|---|---|
| 3,680,467 A | * | 8/1972 | Brock ................ B60H 1/00464 454/136 |
| 3,832,939 A | | 9/1974 | Kakei et al. |
| 4,492,151 A | | 1/1985 | Mattei |
| 4,531,453 A | | 7/1985 | Warman et al. |
| 5,142,879 A | * | 9/1992 | Nakamura ............... F24F 3/065 62/160 |

(Continued)

FOREIGN PATENT DOCUMENTS

| | | |
|---|---|---|
| AU | 1357166 | 5/1969 |
| EP | 1372998 B1 | 10/2004 |

(Continued)

OTHER PUBLICATIONS

International Search Report (dated Feb. 23, 2017) for corresponding International App. PCT/SE2016/050503.

(Continued)

*Primary Examiner* — Steven B McAllister
*Assistant Examiner* — Charles R Brawner
(74) *Attorney, Agent, or Firm* — Sage Patent Group

(57) ABSTRACT

A climate system for providing air to a cab of a vehicle includes a first conduit, an outlet end of the first conduit being adapted to be arranged inside of the cab, a pressurized air source, an inlet end of the first conduit being connected to the pressurized air source for supplying compressed air into the cab by the first conduit.

21 Claims, 9 Drawing Sheets

(56) References Cited

U.S. PATENT DOCUMENTS

| | | | |
|---|---|---|---|
| 5,279,459 A | 1/1994 | Single, II | |
| 5,765,635 A | 6/1998 | Rhee | |
| 8,580,005 B2 | 11/2013 | Stieglitz et al. | |
| 2007/0289322 A1* | 12/2007 | Mathews | F24F 11/77 62/225 |
| 2012/0204589 A1 | 8/2012 | Krellner et al. | |
| 2013/0104995 A1* | 5/2013 | Morishita | B60H 1/32 137/1 |
| 2015/0197135 A1 | 7/2015 | Chen et al. | |

FOREIGN PATENT DOCUMENTS

| | | |
|---|---|---|
| EP | 2591999 A2 | 5/2013 |
| GB | 573760 A | 12/1945 |
| JP | 2005/178503 A | 7/2005 |
| KR | 10-2010-0097968 A | 9/2010 |

OTHER PUBLICATIONS

Extended European Search Report dated Jan. 15, 2020 for European Patent Application No. 16904178.7, 7 pages.
Article 94(3) EPC Communication, European Application No. 16904178.7, dated Dec. 7, 2020, 5 pages.

\* cited by examiner

CLIMATE SYSTEM FOR PROVIDING AIR TO A CAB OF A VEHICLE

BACKGROUND AND SUMMARY

The invention relates to a climate system for providing air to a cab of a vehicle. The invention also relates to an arrangement comprising such a climate system and a cab, and also to a vehicle comprising such an arrangement.

The invention is applicable on working machines within the fields of industrial construction machines or construction equipment, in particular wheel loaders. Although the invention will be described with respect to a wheel loader, the invention is not restricted to this particular machine, but may also be used in other working machines such as articulated haulers, excavators and backhoe loaders. The invention can also be applied in heavy-duty vehicles, such as trucks, buses and construction equipment. The invention may also be used in other vehicles such as cars.

A working machine, e.g. a wheel loader or an articulated hauler, is usually provided with a bucket, container or other type of implement for digging, carrying and/or transporting a load.

For example, a wheel loader has a lift arm unit for raising and lowering an implement, such as a bucket. The lift arm comprises hydraulic cylinders for movement of a load arm and the implement attached to the load arm. Usually a pair of hydraulic cylinders is arranged for raising the load arm and a further hydraulic cylinder is arranged for tilting the implement relative to the load arm.

In addition, the working machine is often articulated frame-steered and has a pair of hydraulic cylinders for turning/steering the working machine by pivoting a front section and a rear section of the working machine relative to each other.

The hydraulic system generally further comprises at least one hydraulic pump, which is arranged to supply hydraulic power, i.e. hydraulic flow and hydraulic pressure, to the hydraulic cylinders. The hydraulic pump is driven by a power source, such as an internal combustion engine or an electric motor.

A working machine normally comprises a climate system to provide a comfortable air climate for a driver in a cab of the working machine. The climate system distributes air with a suitable temperature and humidity to the cab. The climate system should also be adapted to provide a suitable air quality for wind shield defrosting. Climate systems are also used in vessels such as vehicles, boats and aircraft. An example of a vehicle climate system is presented in US2015197135.

A problem with climate systems is that they include ducts which may be space consuming. For example in working machines such ducts may be difficult to fit during a design phase since they require large volumes under instrument panels and interior trim panels. A good visibility for an operator of a working machine is important for safety reasons, but air ducts may contribute to obstruction of operator visibility.

It is desirable to provide more space in a cab of a vehicle, in particular a working machine. It is also desirable to increase the visibility in a cab of a vehicle, in particular a working machine.

An aspect of the invention provides a climate system for providing air to a cab of a vehicle, the climate system comprising a first conduit, an outlet end of the first conduit being adapted to be arranged inside of the cab, characterized in that the climate system comprises a pressurized air source, an inlet end of the first conduit being connected to the pressurized air source for supplying compressed air into the cab by means of the first conduit.

The cab may be a driver's cab, i.e. arranged to house a driver of the vehicle. The cab may define a space, the outlet end of the conduit being located in the space, whereby the conduit communicates with the space. Although the climate system of the invention may be adapted to provide air to a cab of a vehicle, the climate system may also be adapted to provide air to a cab of some other type of vessel, such as a boat or an aircraft.

Since the inlet end of the first conduit is connected to the pressurized air source for supplying compressed air into the cab, the first conduit may be provided with a substantially thinner cross-section, compared to those of conduits and ducts in known climate systems. Using the climate system according to the invention a cab climate system will take up much less space in the cab. The invention makes it possible to route air ducts in very narrow areas, thereby avoiding obstruction of the visibility for the driver/operator.

The invention allows the first conduit to be provided as a thin, flexible hose. Such a hose can be cut to desired length making adaptations to different cab designs very easy. Air ducts may be installed similarly to the installation of electrical wiring. Also, the invention may allow more space for servicing. Also, it the first conduit is provided as a flexible hose, handling it and removing it during service will be much easier compared to handling of ducts in traditional vehicle climate systems.

Preferably, the pressurized air source is arranged to compress air so as for it to present a pressure of at least 1 bar, more preferably at least 3 bars, above the atmospheric pressure. The pressurized air source may be arranged to receive air and to compress the received air so as for it to present a pressure of at least 1 bar above the pressure of the air when received. Preferably the air is compressed to a pressure which is substantially above the atmospheric pressure. Thereby, a compression ratio is, provided securing that a flow in the first conduit may be substantially larger than in ducts of traditional climate systems, in turn securing said advantageous possibility of providing the first conduit as a thin conduit. It is understood that the atmospheric pressure is the pressure of immediate surrounding atmosphere.

Preferably, a valve is provided functionally between the pressurized air source and the outlet end of the conduit for controlling the supply of compressed air into the cab. Thereby an effective means of controlling the air flow through the first conduit is provided. It should be noted that the valve being provided functionally between the pressurized air source and the first conduit outlet end means that the valve may control the communication between the pressurized air source and the first conduit outlet end. However, it is understood that the valve does not necessarily have to be located spatially between the pressurized air source and the first conduit outlet end.

The climate system may comprise a second conduit, an inlet end of the second conduit being connected to the pressurized air source or the first conduit, an outlet end of the second conduit being adapted to be arranged inside of the cab. Thereby, pressurized air may be distributed to different parts of an internal space delimited by the cab.

Where a valve is provided as described, the second conduit may branch off from the first conduit at a branching point, the valve being located functionally between the pressurized air source and the branching point. Thereby, the valve may fill the function of a main valve by means of which the flow through the first conduit as well as the second conduit may be controlled by the single valve.

In advantageous embodiments the climate system comprises a first valve being located functionally between the inlet end and the outlet end of the first conduit, or, where the second conduit branches off from the first conduit at a branching point, between the branching point and the outlet end of the first conduit. The climate system may comprise a second valve being located functionally between the inlet end and the outlet end of the second conduit. Thereby, the first and second valves may be used to individually control the flows through the first and second conduits.

The pressurized air source preferably comprises an air compressor. The compressor may be of any suitable type, e.g. a piston compressor, a centrifugal compressor, a rotary screw compressor, or a vane compressor. Suitably an air filter is provided upstream of the compressor. Preferably, the pressurized air source comprises a pressure tank arranged functionally between the air compressor and the first conduit so as for the pressure tank to store air compressed by the air compressor. Thereby, an advantageous compressed air storage is provided, allowing an effective control of the air distribution to the cab. Where the climate system is provided in a hybrid electric vehicle, and the air compressor is arranged to be driven by an internal combustion engine therein, the pressure tank may be particularly advantageous. More specifically, since the engine in a hybrid electric vehicle typically is repetitively shut down and started at relatively high frequencies, the pressure tank may provide the function of a buffer for storing compressed air during periods where the compressor in inactive due to the engine being shut down.

Preferably, the first conduit presents a transport air flow cross-sectional area, the first conduit comprising a first nozzle forming the outlet end, the first nozzle presenting a nozzle air flow cross-sectional area being substantially larger than the transport air flow cross-sectional area. Thereby, a widening flow cross-section is provided at the first conduit outlet end. This means that the compressed air, allowing a thin first conduit but resulting in a high air speed through the first conduit, may be advantageously slowed down before entering the interior space of the cab.

Preferably, the nozzle air flow cross-sectional area is at least five times larger, more preferably at least ten times larger, than the transport air flow cross-sectional area. Thereby a nozzle is provided, the outer cross-sectional area of which is substantially larger than the cross-sectional area of the first conduit, allowing a particularly high air speed reduction from a high level of air compression. More generally, the nozzle air flow cross-sectional area is preferably at least two times larger than the transport air flow cross-sectional area. For example, the nozzle air flow cross-sectional area may be 2-200, preferably 15-50, times larger than the transport air flow cross-sectional area. The nozzle air flow cross-sectional area is preferably substantially larger than the transport air flow cross-sectional area.

The ratio of the nozzle air flow cross-sectional area and the transport air flow cross-sectional area is preferably adapted to the air compression ratio of the pressurized air source. I.e. when designing the climate system, it is preferably taken into account that with an increasing compression ratio of the pressurized air source an increasing ratio of the nozzle air flow cross-sectional area and the transport air flow cross-sectional area may follow. Advantageously, the ratio of the nozzle air flow cross-sectional area and the transport air flow cross-sectional area is preferably also adapted to the length of the first conduit. I.e. with an increasing length of the first conduit a decreasing ratio of the nozzle air flow cross-sectional area and the transport air flow cross-sectional area may follow, given that the compression ratio of the pressurized air source remains the same. It is understood that for a given ratio of the nozzle air flow cross-sectional area and the transport air flow cross-sectional area, an increasing length of the first conduit may be followed by an increased capacity of the pressurized air source, i.e. an increased compression ratio thereof.

Where the climate system comprises a second conduit, an outlet end of the second conduit being adapted to be arranged inside of the cab, an inlet end of the second conduit being connected to the pressurized air source or the first conduit so as for the second conduit to supply compressed air into the cab, the second conduit may present a transport air flow cross-sectional area, the second conduit comprising a second nozzle forming the outlet end of the second conduit, the second nozzle presenting a nozzle air flow cross-sectional area being substantially larger than the transport air flow cross-sectional area of the second conduit. Thereby, an advantageous air speed reduction may be provided at the second conduit outlet end, similarly to what was described above.

In advantageous embodiments, the climate system comprises a first fluid circuit and a first heat exchanger arranged so as for heat to be exchanged between the air supplied by the first conduit from the pressurized air source into the cab, and a fluid in the first fluid circuit. The first heat exchanger is preferably located at the outlet end of the first conduit. Thereby, the temperature of the air transported through the first conduit may be effectively controlled.

Preferably, where a first nozzle is provided as described above, the first heat exchanger is located inside the first nozzle. Thereby a particularly advantageous embodiment is provided, wherein the above described wider shape of the nozzle may be used for, in addition to slowing down the air speed and mentioned, cab the first heat exchanger. The also, heat may be exchanged close to where the air is delivered to the cab interior, so that heat loses at fluid transport may be reduced or eliminated.

Preferably, where the climate system comprises a second conduit, an outlet end of the second conduit being adapted to be arranged inside of the cab, an inlet end of the second conduit being connected to the pressurized air source or the first conduit so as for the second conduit to supply compressed air into the cab, the climate system comprises a second heat exchanger arranged so as for heat to be exchanged between the air supplied by the second conduit into the cab, and the fluid in the first fluid circuit or a fluid in a second fluid circuit of the climate system.

Thereby, each conduit outlet end can be controlled separately with regards to air temperature. Thus, different temperatures may be obtained at different locations in the cab. For example, where a second fluid circuit is provided, each of the first and second fluid circuits may be provided with a respective valve for controlling the flow in the respective of the first and second fluid circuits. Thereby, by adjusting the valves the rate of the heat exchange at the respective of the first and second heat exchangers can be controlled individually by the driver or a climate system control system.

In alternative embodiments, the fluid circuits for the first and second heat exchangers may be partially or fully integrated. For example, the first and second heat exchangers may share the first fluid circuit, in which case a single valve could be provided to control the flow in the circuit.

Preferably, the climate system comprises a further heat exchanger and also a heat source and/or an air conditioning circuit, the further heat exchanger being arranged so as for heat to be exchanged between on one hand the fluid in the first fluid circuit and on the other hand a fluid in a further circuit connected to the heat source and/or a fluid in the air conditioning circuit. Thereby, heat may be provided to the cab via the air supplied by the first conduit, the first heat exchanger, the first fluid circuit, the further heat exchanger, and the heat source. Alternatively, by means of the connection to the air conditioning circuit, heat may be removed from the air supplied to the cab by the first conduit, via the first heat exchanger, the first fluid circuit, the further heat exchanger, and air conditioning circuit.

The fluid in first fluid circuit may be water, e.g. with an anti-freeze liquid, or oil. Thus, the first fluid circuit may be provided with simple conduits, e.g. flexible hoses, for guiding the fluid. The provision of the further heat exchanger provides a particular advantage when the climate system comprises an air conditioning circuit. The further heat exchanger may be positioned outside the cab. Thereby, during service of the vehicle, the cab may be removed without any need to break and empty the air conditioning circuit, which requires special costly equipment, is complicated and not easily done outside a service establishment arranged for this purpose. With the further heat exchanger included in the climate system, it may be possible to simply break the water or oil carrying first fluid circuit, and the remove the cab from the vehicle. Breaking a water or oil based circuit may be much simpler than breaking an air conditioning circuit.

In advantageous embodiments, both the further circuit connected to the heat source and the air conditioning circuit are connectable, e.g. via suitable valve arrangements, to the further heat exchanger. Thereby, the further heat exchanger may be arranged so as for heat to be exchanged selectively either between the fluid in the first fluid circuit and the fluid in the further circuit connected to the heat source, or between the fluid in the first fluid circuit and the fluid in the air conditioning circuit. This allows a selective delivery of heat and cold air to the cab, depending on whether the further heat exchanger is connected to the heat source or to the air conditioning circuit.

In other embodiments, only the further circuit connected to the heat source is connectable to the further heat exchanger. In further embodiments, only the air conditioning circuit is connectable to the further heat exchanger.

In some embodiments, where the climate system comprises a heat source, the climate system is arranged so as for heat to be exchanged between the fluid in the first fluid circuit and the heat source. Thereby, heat may be exchanged directly between the heat source and the fluid in the first fluid circuit, e.g. by means of an additional heat exchanger arranged at, in or adjacent to the heat source. Thereby, and simple and reliable solution for heating the air guided by the first conduit may be provided.

Where the climate system comprises an air conditioning circuit, the climate system may be arranged so as for heat to be exchanged between the fluid in the first fluid circuit and the air conditioning circuit. Thereby, heat may be exchanged directly between an evaporator of the air conditioning circuit and the fluid in the first fluid circuit. Similarly to embodiments with the further heat exchanger described above, embodiments for such a direct heat exchange provide a particular advantage when the evaporator is positioned outside the cab. Thereby, during service of the vehicle, the cab may be removed without any need to break and empty the air conditioning circuit Instead, it may be possible to simply break the water or oil carrying first fluid circuit, and the remove the cab from the vehicle.

Advantageously, the climate system may comprise a valve arrangement and also a heat source and an air conditioning circuit, the valve arrangement being arranged so as for the fluid in the first fluid circuit to be selectively directed to the heat source and to the air conditioning circuit. Thereby, a simple solution is provided for heat to be exchanged selectively either between the fluid in the first fluid circuit and the heat source, or between the fluid in the first fluid circuit and the fluid in the air conditioning circuit. This allows a selective delivery of heat and cold air to the cab, depending on whether the first fluid circuit is connected to the heat source or to the air conditioning circuit.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
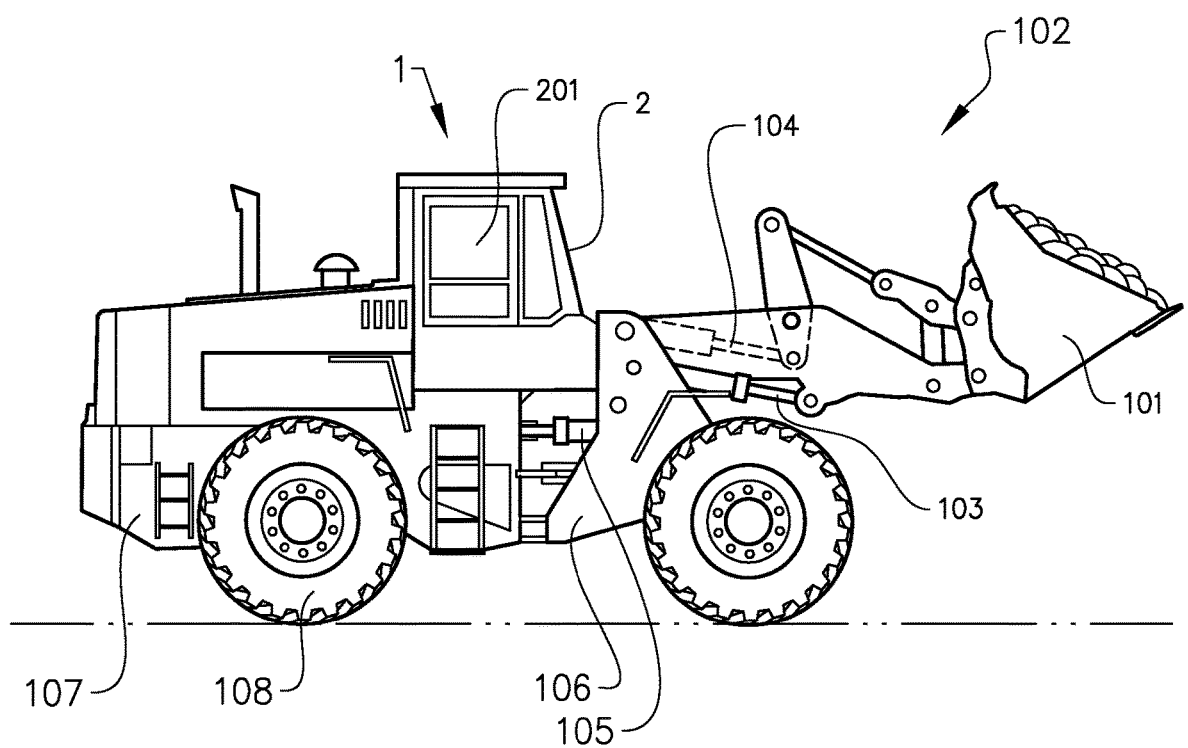
FIG. 1 is a side view of a working machine in the form of a wheel loader.

FIG. 1 is an illustration of a vehicle in the form of a working machine 1, more specifically in the form of a wheel loader. The wheel loader is an example of a working machine where a climate system according to a suitable embodiment of the invention can be applied.

The wheel loader 1 has an implement 101. The term "implement" is intended to comprise any kind of tool controlled by hydraulics, such as a bucket, a fork or a gripping tool. The implement 101 illustrated in FIG. 1 is a bucket 101 which is arranged on a load arm 102 for lifting and lowering the bucket 101. Further the bucket can be tilted relative to the load arm. In the example illustrated in FIG. 1, a hydraulic system of the wheel loader 1 comprises two hydraulic cylinders 103 for the operation of the load arm 102 and one hydraulic cylinder 104 for tilting the bucket 101 relative to the load arm.

The hydraulic system of the wheel loader further comprises two hydraulic cylinders 105, steering cylinders, arranged on opposite sides of the wheel loader 1 for turning the wheel loader by means of relative movement of a front body part 106 and a rear body part 107. In other words: The wheel loader 1 is articulated and frame steered by means of the steering cylinders 105. There is a pivot joint connecting the front body part 106 and the rear body part 107 of the wheel loader 1 such that these parts are pivotally connected to each other for pivoting about a substantially vertical axis.

The wheel loader 1 is provided with four wheels 108, i.e. two on each body part 106, 107. The wheel loader 1 has a propulsion system with an internal combustion engine (not shown), arranged to drive the wheels 108 via a drivetrain including a transmission. The engine is also arranged to drive various auxiliary devices of the wheel loader, as exemplified below. In addition, the engine is arranged to drive a generator, in turn arranged to provide power to electric auxiliary devices, which may be used as exemplified below. In some alternative embodiments, the wheel loader may have an electric hybrid propulsion system wherein the engine is connected to a generator, in turn connected to an electric storage arrangement in the form of a battery pack. In such embodiments, the propulsion of the wheel loader may be provided by electric motors in the hubs of the wheels 108. It should be noted that the invention is also applicable to working machines with other types of propulsion systems, e.g. fully electric propulsion systems.

The wheel loader further comprises a cab 2. The cab 2 is arranged to delimit a space 201. The cab 2 is arranged to accommodate a driver of the wheel loader 1, and various control devices for the driver's control of the wheel loader.

Figure 2:
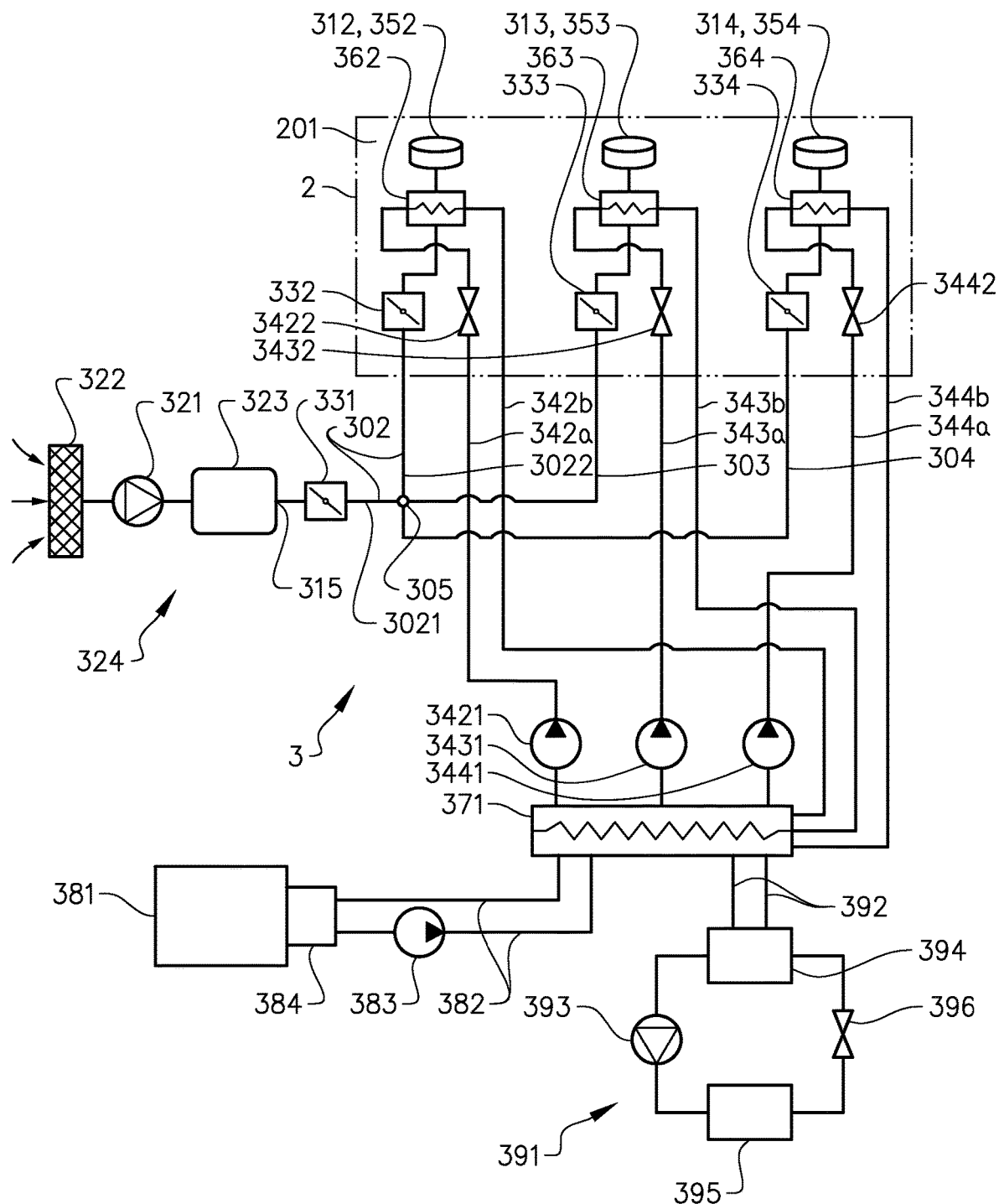
FIG. 2 is a diagram depicting a climate system and a cab of the wheel loader in FIG. 1.

Reference is made to FIG. 2. The cab 2 is part of an arrangement which also includes a climate system 3 for providing air to the cab 2. The climate system 3 comprises a first conduit 302, a second conduit 303 and a third conduit 304. Inlet ends 305 of the second and third conduits 303, 304 are connected to the first conduit 302. Thereby, the second and third conduits branches off from the first conduit at a branching point 305. It should be noted that in alternative embodiments, different numbers of conduits are provided. For example, there may be only one or two conduits, or more than three conduits in the climate system 3.

The conduits 302-304 are arranged to be supplied with pressurized air as described below. Outlet ends 312, 313, 314 of the first, second and third conduits 302-304 are arranged inside of the cab 2, i.e. in the space 201. Outlet ends 312, 313, 314 of the first, second and third conduits 302-304 present a first nozzle 352, a second nozzle 353 and a third nozzle 354, respectively, described closer below. The first conduit 302 is arranged so as to direct air towards a windshield of the cab 2. The second conduit 303 is arranged so as to direct air towards the torso and/or face of the driver. The third conduit 304 is arranged to direct air in a lower part of the space 201 defined by the cab 2. It should be noted that such a distribution of air from the conduits 302-304 in the cab 2 is an example only. The number of conduits may differ, and they may be arranged to distribute air in the cab 2 in a variety of alternative manners.

The climate system 3 comprises a pressurized air source 324, an inlet end 315 of the first conduit 302 being connected to the pressurized air source 324 for supplying compressed air into the cab 2 by means of the first, second and third conduit 302-304. A portion of the first conduit 302, between the pressurized air source 324 and the branching point 305 forms a common conduit 3021 for guiding air towards the outlet ends 312, 313, 314 of the first, second and third conduits 302-304. It should be noted that in some embodiments, the second and third conduits 303, 304 may branch off from the first conduit 302 at separate locations along the first conduit 302. In alternative embodiments, inlet ends of the second and third conduits 303, 304 may be connected directly to the pressurized air source 324.

A valve 331 is located functionally between the pressurized air source 324 and the branching point 305 for controlling the supply of compressed air into the cab 2. The valve 331 may be referred to as a main valve 331.

The main valve 331 may or may not be located spatially between the pressurized air source 324 and the branching point 305. The main valve 331 may be located along the common conduit 3021, which may be bent such that the main valve 331 is not located spatially between the pressurized air source 324 and the branching point 305; nevertheless in such a case the main valve 331 would still be located functionally between the pressurized air source 324 and the branching point 305 since the main valve controls the communication between the pressurized air source 324 and the branching point 305.

The main valve 331 provides a central control of the air flow through all conduits 301. It should be noted that the main valve 331 may be provided inside or outside the cab 2. Further, the main valve 331 may be controlled by direct handling by the driver, or remotely, e.g. via a control wire or an electric control arrangement.

The climate system 3 further comprises a first valve 332, a second valve 333, and a third valve 334 being located functionally between the branching point 305 and the outlet end 312-314 of the first, second and third conduit 302-304, respectively. Thereby, by adjusting the valves 332-334, the emissions of air from the first, second and third conduits 302-304 can be controlled individually by the driver or a climate system control system.

It should be noted that in some embodiments, such valves 332-334 for individual control of the air flow in the conduits 302-304, the main valve 331 may be omitted. In other embodiments, valves 332-334 for individual control of the air flow in the conduits 302-304 may be omitted, and there may be only a central control of the air flow through all conduits by the main valve 331.

The pressurized air source 324 comprises an air compressor 321 which may be driven by an electric or hydraulic motor or by the engine of the wheel loader. The air compressor 321 is arranged to receive air from the surrounding atmosphere via an air filter 322. The compressor 321 may be of any suitable type, e.g. a piston compressor, a centrifugal compressor, a rotary screw compressor, or a vane compressor.

The pressurized air source 324 also comprises a pressure tank 323 arranged functionally between the air compressor 321 and the first conduit 302 so as for the pressure tank 323 to store air compressed by the air compressor 321. The compressor 321 is adapted to compress air so as for it to present a pressure of 5-6 bar above the atmospheric pressure. Of course other compression ratios may be possible, but preferably the air is compressed to a pressure which is substantially above the atmospheric pressure.

A first heat exchanger 362, a second heat exchanger 363 and a third heat exchanger 364 are located in the first, second and third nozzles 352-354, respectively, of the outlet ends 312-314 of the first, second and third conduits 302-304.

A first fluid circuit 342a-342b, a second fluid circuit 343a-343b and a third fluid circuit 344a-344b extend between a respective of the first, second and third heat exchangers 362-364 and a further heat exchanger 371. Thereby, each of the first, second and third fluid circuits 342a-344b present a delivery conduit 342a, 343a, 344a arranged to guide a fluid from the further heat exchanger 371 to the respective of the first, second and third heat exchangers 362-364. Further each of the first, second and third fluid circuits 342a-344b present a return conduit 342b, 343b, 344*b* arranged to guide a fluid from the respective of the first, second and third heat exchangers 362-364 to the further heat exchanger 371.

Each of the first, second and third fluid circuits 342*a*-344*b* is provided with a respective pump 3421, 3431, 3441 for moving the fluid in the respective of the first, second and third fluid circuits 342*a*-344*b*. The pumps 3421-3441 may be driven by respective electric or hydraulic motors or by the engine of the wheel loader. Thereby, the first, second and third heat exchangers 362-364 are arranged so as for heat to be exchanged between the air supplied by the first, second and third conduits 302-304 from the pressurized air source 324 into the cab 2, and the fluid in the respective of the first, second and third fluid circuits 342*a*-344*b*.

Each of the first, second and third fluid circuits 342*a*-344*b* are provided with a respective valve 3422-3442 for controlling the flow in the respective of the first, second and third fluid circuits 342*a*-344*b*. Thereby, by adjusting the valves 3422-3442 the rate of the heat exchange at the respective of the first, second and third heat exchangers 362-364 can be controlled individually by the driver or a climate system control system.

In alternative embodiments, the first, second and third fluid circuits 342*a*-344*b* may be partially or fully integrated. For example, the delivery and return conduits of the circuits may be partially arranged as common conduits. Thereby, said valves 3422-3442 may be replaced by a single valve located in a common part of the delivery conduits 342*a*, 343*a*, 344*a* or the return conduits 342*b*, 343*b*, 344*b*. In further alternative embodiments, the first, second and third heat exchangers 362-364 may share a single fluid circuit 342*a*-342*b*, in which case a single valve could be provided to control the flow in the circuit. Also, in embodiments, where the first, second and third fluid circuits 342*a*-344*b* are partially or fully integrated, a single pump may be provided instead of the three pumps 3421, 3431, 3441 mentioned above.

The climate system comprises a heat source 381 arranged to communicate with the further heat exchanger 371 via heat source conduits 382. The heat source may be e.g. a cooling system of the engine of the wheel loader, the engine itself, a hydraulic system of the wheel loader, or a battery pack of the wheel loader. A pump 383 is provided to move a heat carrying fluid in the heat source conduits 382. An additional heat exchanger 384 is arranged so as for heat to be exchanged between the fluid in the heat source conduits 382 and the heat source 381. Thereby, heat may be provided to the cab 2 via the air supplied by the first, second and third conduits 302-304, the first, second and third heat exchangers 362-364, the first, second and third fluid circuits 342*a*-344*b*, the further heat exchanger 371, and the heat source 381. It should be noted that in some embodiments, e.g. where the heat source 381 is the engine itself, the additional heat exchanger 384 may be integrated with the heat source. For example, the heat source conduits 382 may be integrated in the engine block, similarly to cooling circuit conduits in known engine systems, whereby the additional heat exchanger is formed by this integration. It should also be noted that is some embodiments, the heat source conduits 382 may form at least parts of a cooling system for the engine or some other heat source in the vehicle.

The climate system 3 comprises an air conditioning circuit 391 arranged to communicate with the further heat exchanger 371 via AC conduits 392. The air conditioning circuit 391 comprises, as is known per se, a compressor 393, which may be driven by an electric or hydraulic motor or by the engine of the wheel loader. The air conditioning circuit 391 also comprises an evaporator 394, a condenser 395 and a thermal expansion valve 396. In some alternative embodiments, the evaporator 394 may be integrated with the further heat exchanger 371.

By means of the connection to the air conditioning circuit 391, heat may be removed from the air supplied to the cab 2 by the first, second and third conduits 302-304, via the first, second and third heat exchangers 362-364, the first, second and third fluid circuits 342*a*-344*b*, the further heat exchanger 371, and air conditioning circuit 391.

It should be noted that the further heat exchanger 371 may be sectioned and combined with valves so as for heat from the heat source 381 to be delivered to one or some of the fluid circuits 342*a*-344*b* while simultaneously the fluid in the remaining of the fluid circuits is cooled by means of the air conditioning circuit. 391. Thereby, for example, cold air may be delivered towards the face and torso of the driver while heated air is delivered towards the feet of the driver.

Figure 3:
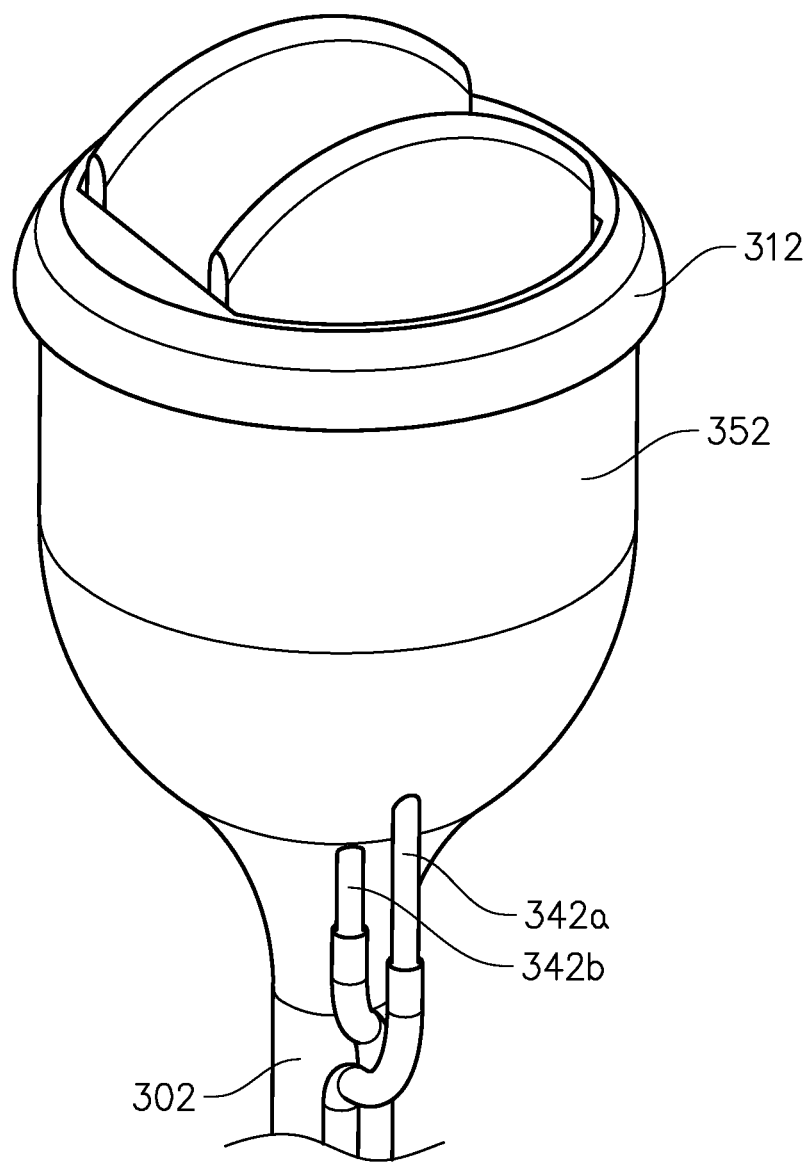
FIG. 3 and FIG. 4 show a perspective view and a partially sectioned perspective view, respectively, of a part of the climate system in FIG. 2.
Figure 4:
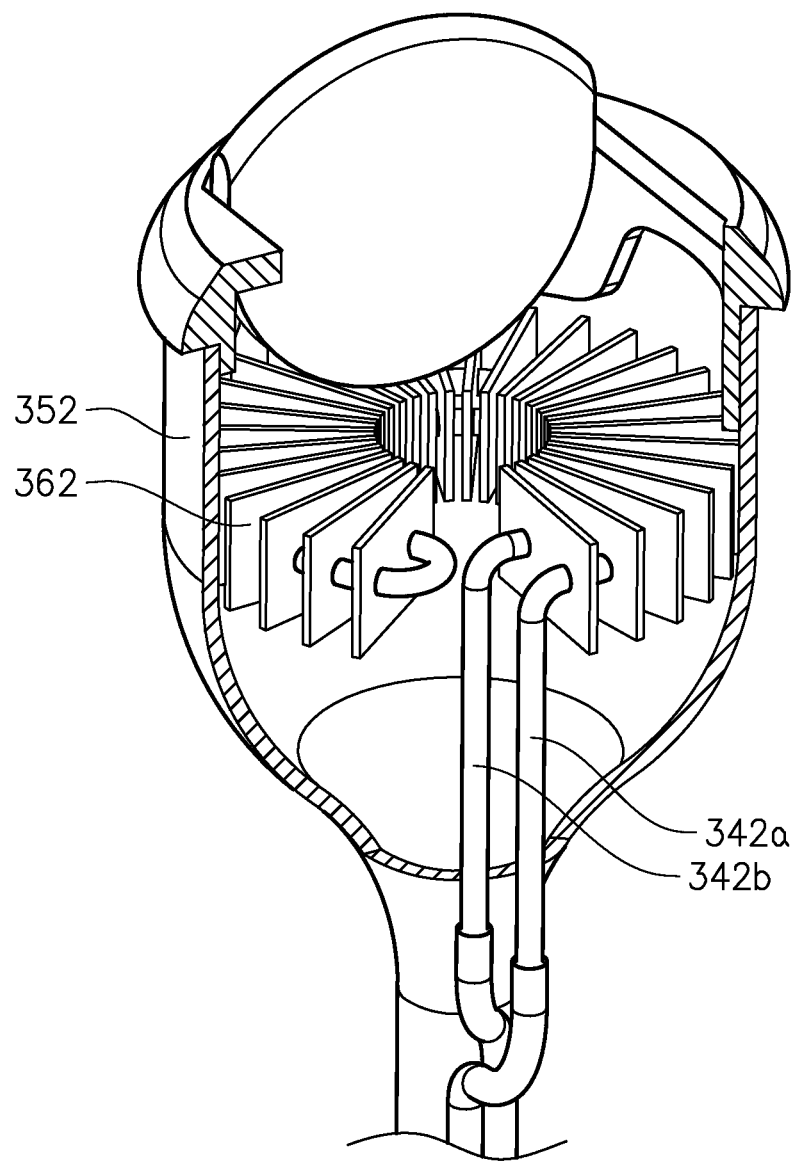

Reference is made to FIG. 3 and FIG. 4 showing the first nozzle 352. The second and third nozzles 353, 354 are in this embodiment identical to the first nozzle 352. However, in some embodiments the nozzles may be dissimilar.

A part of the first conduit 302 between the first nozzle 352 and the branching point 305 (FIG. 2) is herein referred to as the branched part 3022 of the first conduit. In this embodiment, the branched part 3022 of the first conduit presents a cross-section having the same shape and dimensions as those of the cross-sections of the second and third conduits 303, 304. The branched part 3022 of the first conduit presents what is herein referred to as a transport air flow cross-sectional area, which is the area of a cross-section of a fluid transporting interior of the branched part 3022, which cross-section is oriented perpendicularly to the local flow direction.

As can be seen in FIG. 3, the first nozzle 352 has a substantially larger cross-section than the branched part 3022 of the first conduit. More specifically, the first nozzle 352 presents what is herein referred to as a nozzle air flow cross-sectional area, which is the area of a cross-section of a fluid transporting interior of the first nozzle 352, which cross-section is oriented perpendicularly to the local general flow direction. The nozzle air flow cross-sectional area is substantially larger than the transport air flow cross-sectional area, in this example approximately 30 times larger. It should be noted that this area ratio is merely an example. In advantageous embodiments, the nozzle air flow cross-sectional area is at least five times larger than the transport air flow cross-sectional area. The ratio of the nozzle air flow cross-sectional area and the transport air flow cross-sectional area is preferably adapted to the air compression ratio of the pressurized air source 324.

In FIG. 3 and FIG. 4 the first heat exchanger 362 can be seen housed in the first nozzle 352. Also, parts of the delivery conduit 342*a* and the return conduit 342*b* of the first fluid circuit described above can be seen. Advantageously, the delivery conduit 342*a* and the return conduit 342*b* are partly bundled together with a part of the first conduit 302.

Figure 5:
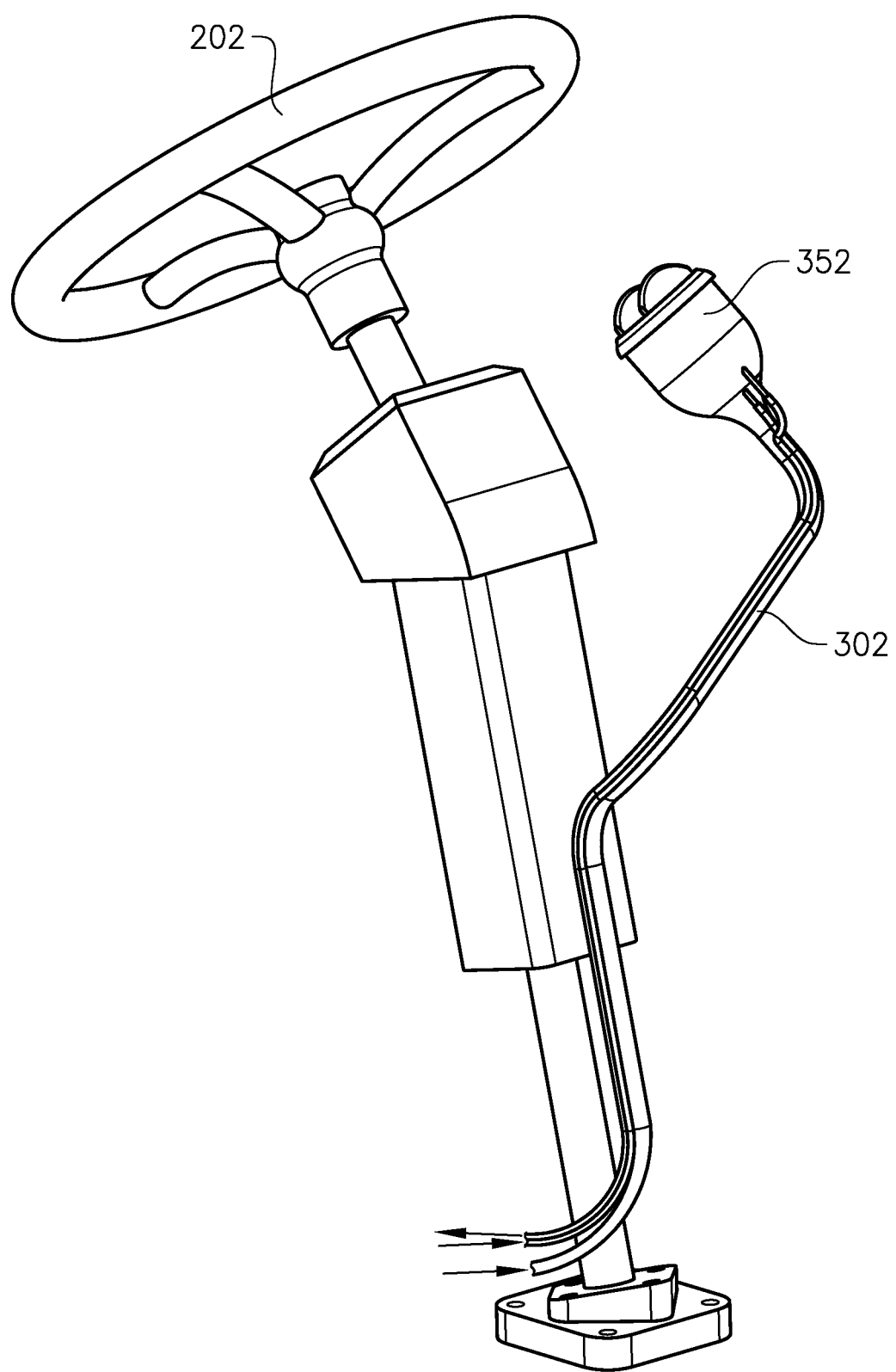
FIG. 5 shows a part of the cab interior of the wheel loader in FIG. 1.

FIG. 5 illustrates with an example particular advantages of embodiments of the invention, i.e. that the first conduit 302 may be provided as a thin and flexible hose at a steering wheel 202 of the wheel loader. The small thickness is allowed by the compressed air. Thereby, the first conduit will consume only a minor part of the cab interior space, and will also allow easy installation and service due to its flexibility. In addition, the first nozzle 352 will as stated provide for a reduction of the high speed of the compressed air before it enters the cab interior.

Figure 6:
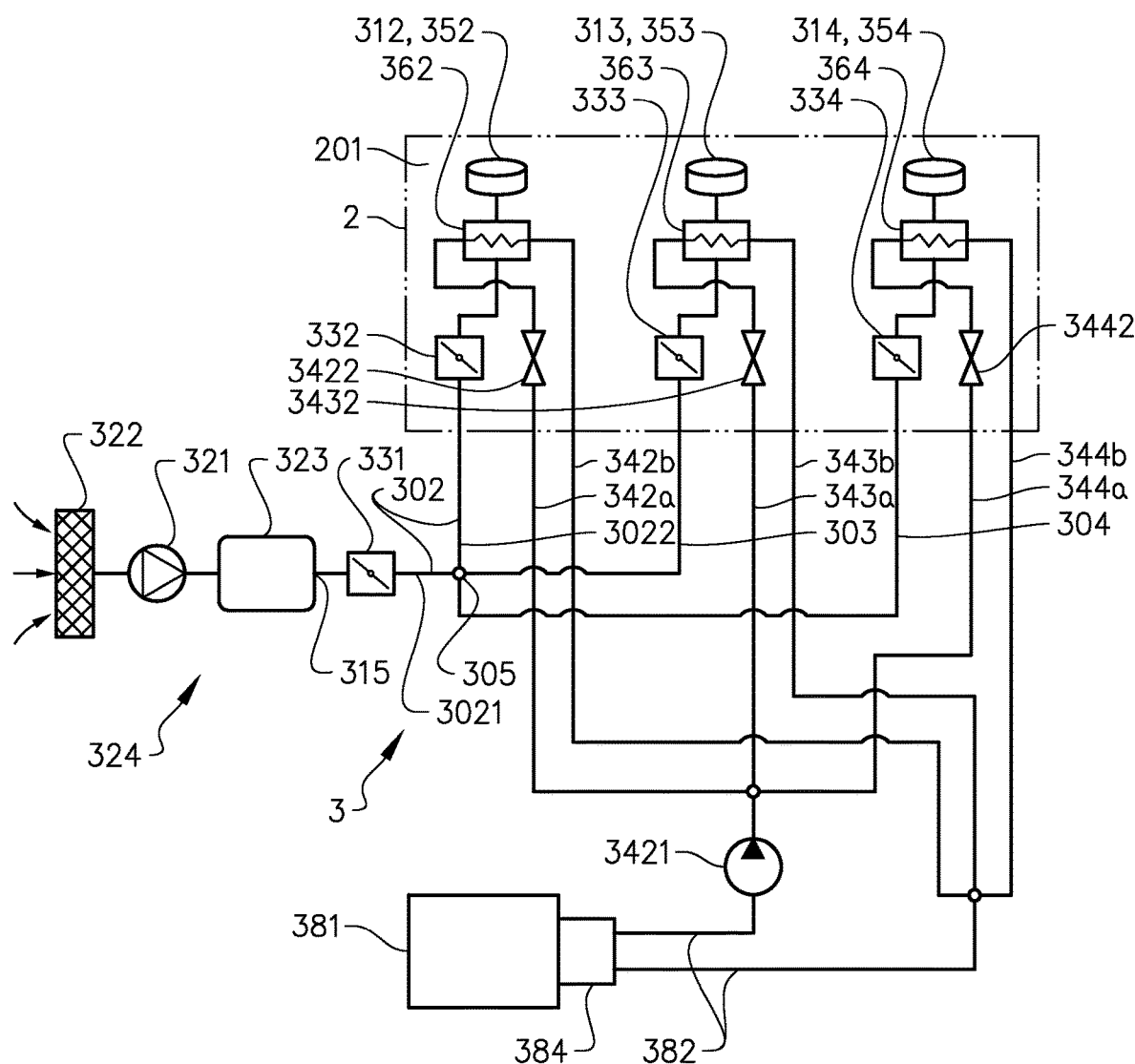
FIG. 6-FIG. 8 are diagrams depicting arrangements, each comprising a climate system and a cab, in alternative embodiments of the invention.

FIG. 6 shows an alternative embodiment of the invention where features are similar to features in the embodiment in FIG. 2, except for the following ones: The climate system 3 does not comprises any air conditioning circuit. The delivery and return conduits of the first, second and third fluid circuits 342a-344b are partially integrated so as to present common conduits, wherein a pump 3421 is provided in the common conduit for delivery. The common conduits are connected to an additional heat exchanger 384 adjacent to the heat source 381. Thereby, heat may be exchanged directly between the fluid in the fluid circuits 342a-344b and the heat source 381 by means of the additional heat exchanger 384.

Similarly to what was said above with reference to FIG. 2, the additional heat exchanger 384 may in some embodiments be integrated with the heat source 381, e.g. where the latter is the engine of the vehicle. In some further embodiments, the first, second and third fluid circuits 342a-344b may form at least parts of a cooling system for a heat source, such as the engine, of the vehicle.

Figure 7:
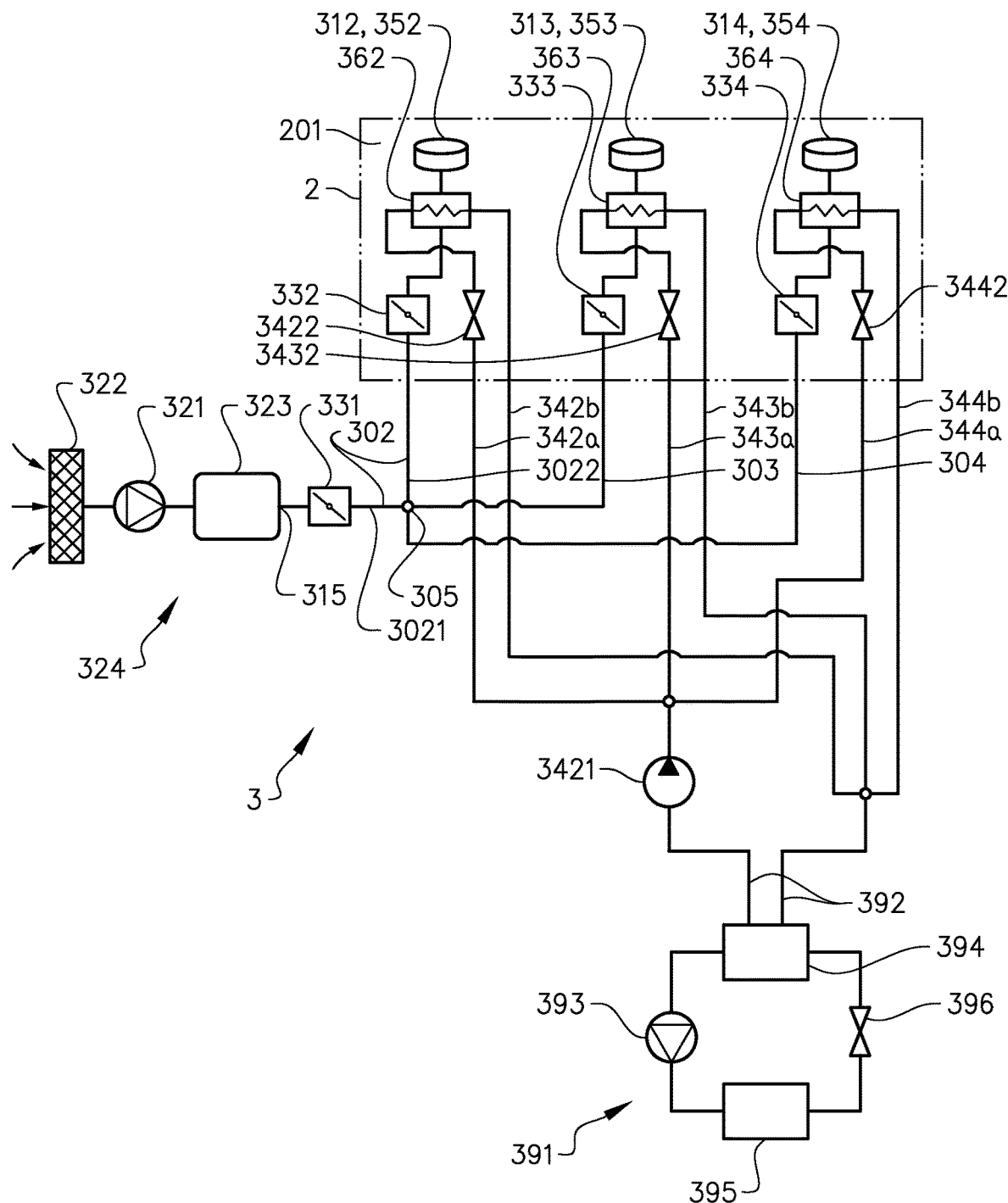

FIG. 7 shows a further embodiment of the invention where features are similar to features in the embodiment in FIG. 2, except for the following ones: The climate system 3 does not present any connection to a heat source. The delivery and return conduits of the first, second and third fluid circuits 342a-344b are partially integrated so as to present common conduits, wherein a pump 3421 is provided in the common conduit for delivery. The common conduits are connected to an evaporator 394 of an air conditioning circuit 391. Thereby, heat may be exchanged directly between the fluid in the fluid circuits 342a-344b and the air conditioning circuit 391 by means of the evaporator 394.

Figure 8:
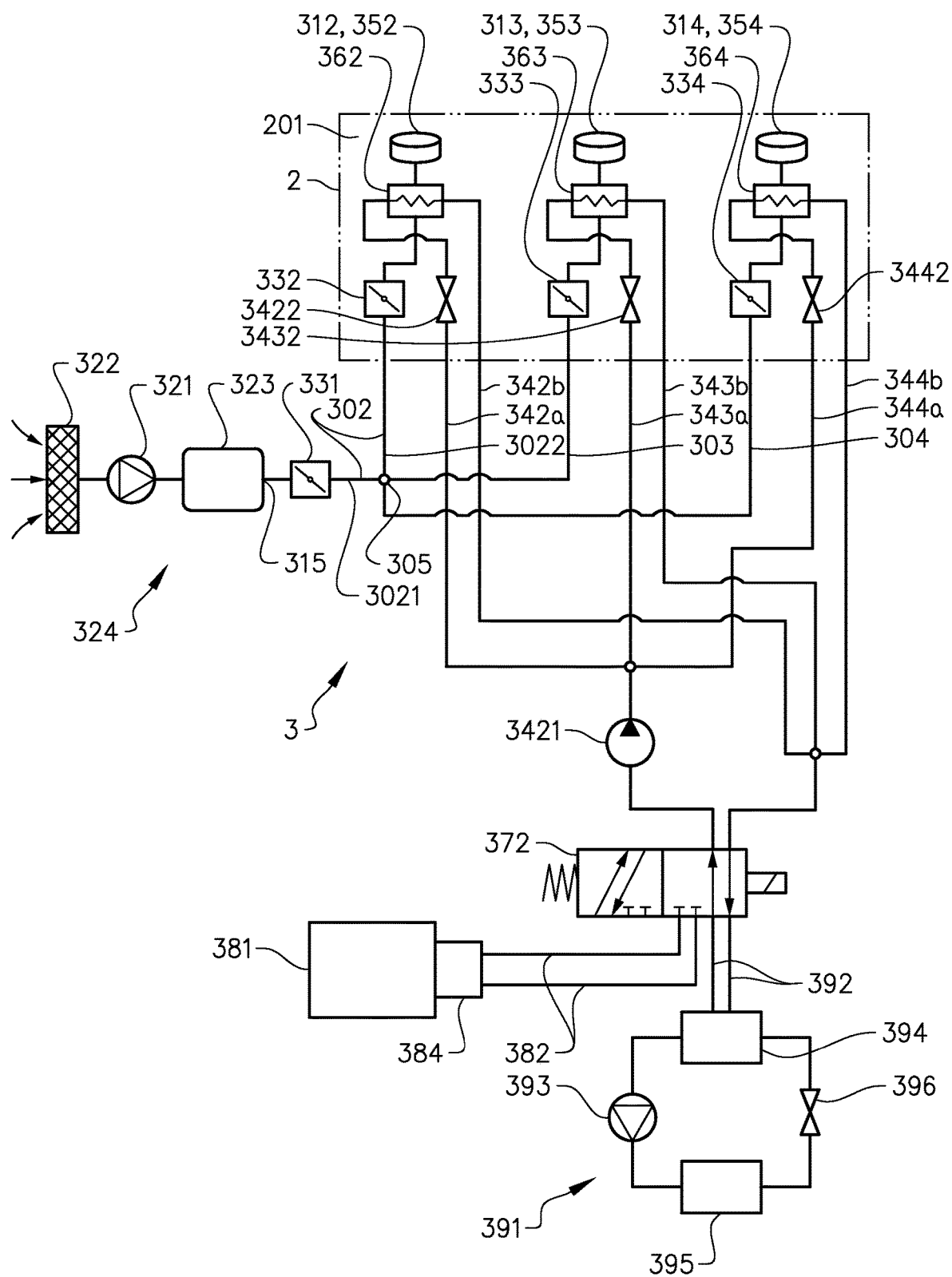

FIG. 8 shows yet another embodiment of the invention where features are similar to features in the embodiment in FIG. 2, except for the following ones: Instead of the further heat exchanger 371, a valve arrangement 372 is provided. The delivery and return conduits of the first, second and third fluid circuits 342a-344b are partially integrated so as to present common conduits, wherein a pump 3421 is provided in the common conduit for delivery. The valve arrangement 372 is provided in the common conduits. The valve arrangement 372 is arranged so as for the fluid in the fluid circuits to be selectively directed to the heat source 381 and to the air conditioning circuit 391. The valve arrangement 372 may be arranged to be controlled electrically by a control unit (not shown) of the climate system 3.

It should be noted that on a cab side of the valve arrangement 372, the fluid circuits 342a-344b may be individually connected to the valve arrangement 372. Thereby the valve arrangement 372 may be adapted so as for heat from the heat source 381 to be delivered to one or some of the fluid circuits 342a-344b while simultaneously the fluid in the remaining of the fluid circuits 342a-344b is cooled by means of the air conditioning circuit. 391.

Figure 9:
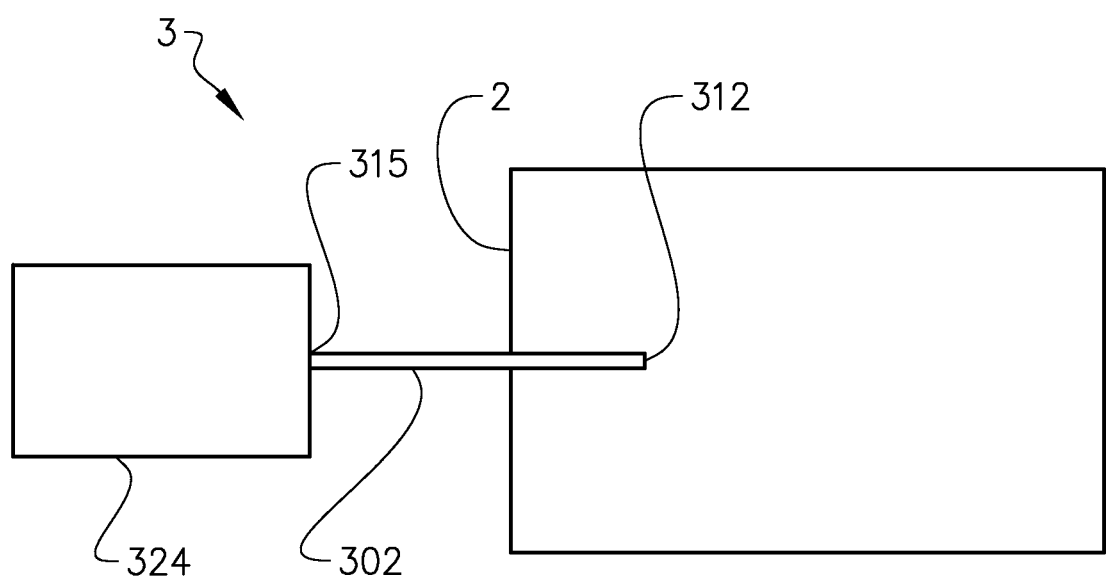
FIG. 9 shows schematically a climate system for providing air to a cab of a vehicle according to a further embodiment of the invention.

It should be noted that more generally the climate system 3 for providing air to a cab of a vehicle, does not necessarily need to include a plurality of conduits as in the embodiments described with reference to FIG. 1-FIG. 8. FIG. 9 shows schematically an embodiment of a climate system 3 comprising a first conduit 302, an outlet end 312 of the first conduit being adapted to be arranged inside of a cab 2. The climate system 3 comprises a pressurized air source 324, an inlet end 315 of the first conduit 302 being connected to the pressurized air source 324 for supplying compressed air into the cab 2 by means of the first conduit 302.

As stated, the invention is not only applicable to working machines, but can be used for other vehicle types such as trucks, buses and cars. It is understood that in some embodiments, the cab may be arranged to be occupied by a plurality of persons. These persons may include, in addition to a vehicle driver, one or more passengers.

It is to be understood that the present invention is not limited to the embodiments described above and illustrated in the drawings; rather, the skilled person will recognize that many changes and modifications may be made within the scope of the appended claims.

The invention claimed is:

1. A climate system for providing air to a cab of a vehicle, the climate system comprising a first conduit, an outlet end of the first conduit being adapted to be arranged inside of the cab, wherein the climate system comprises a pressurized air source, an inlet end of the first conduit being connected to the pressurized air source for supplying compressed air into the cab by means of the first conduit, wherein the climate system comprises a first fluid circuit and a first heat exchanger arranged so as for heat to be exchanged between the air supplied by the first conduit from the pressurized air source into the cab, and a fluid in the first fluid circuit, and wherein the first conduit presents a transport air flow cross-sectional area, the first conduit comprising a first nozzle forming the outlet end, the first nozzle presenting a nozzle air flow cross-sectional area being larger than the transport air flow cross-sectional area, and wherein the first heat exchanger is located inside the first nozzle.

2. A climate system according to claim 1, wherein the pressurized air source is arranged to compress air so as for it to present a pressure of at least 1 bar above the atmospheric pressure.

3. A climate system according to claim 1, wherein the pressurized air source is arranged to compress air so as for it to present a pressure of at least 3 bars above the atmospheric pressure.

4. A climate system according to claim 1, wherein the pressurized air source is arranged to receive air and to compress the received air so as for it to present a pressure of at least 1 bar above the pressure of the air when received.

5. A climate system according to claim 1, wherein a valve is provided functionally between the pressurized air source and the outlet end of the first conduit for controlling the supply of compressed air into the cab.

6. A climate system according to claim 1, wherein the climate system comprises a second conduit, an inlet end of the second conduit being connected to the pressurized air source or the first conduit, an outlet end of the second conduit being adapted to be arranged inside of the cab.

7. A climate system according to claim 5, wherein the climate system comprises a second conduit, an inlet end of the second conduit being connected to the pressurized air source or the first conduit, an outlet end of the second conduit being adapted to be arranged inside of the cab, and the second conduit branches off from the first conduit at a branching point, the valve being located functionally between the pressurized air source and the branching point.

8. A climate system according to claim 6, wherein the climate system comprises a first valve being located functionally between the inlet end and the outlet end of the first conduit, or, where the second conduit branches off from the first conduit at a branching point, the first valve is functionally located between the branching point and the outlet end of the first conduit.

9. A climate system according to claim 6, wherein the climate system comprises a second valve being located functionally between the inlet end and the outlet end of the second conduit.

10. A climate system according to claim 1, wherein the pressurized air source comprises an air compressor.

11. A climate system according to claim 10, wherein the pressurized air source comprises a pressure tank arranged functionally between the air compressor and the first conduit so as for the pressure tank to store air compressed by the air compressor.

12. A climate system according to claim 1, wherein the first conduit presents a transport air flow cross-sectional area, the first conduit comprising a first nozzle forming the outlet end, the first nozzle presenting a nozzle air flow cross-sectional area being larger than the transport air flow cross-sectional area.

13. A climate system according to claim 12, wherein the nozzle air flow cross-sectional area is at least five times larger than the transport air flow cross-sectional area.

14. A climate system according to claim 12, wherein the climate system comprises a second conduit, an outlet end of the second conduit being adapted to be arranged inside of the cab, an inlet end of the second conduit being connected to the pressurized air source or the first conduit so as for the second conduit to supply compressed air into the cab, the second conduit presenting a transport air flow cross-sectional area, the second conduit comprising a second nozzle forming the outlet end of the second conduit, the second nozzle presenting a nozzle air flow cross-sectional area being larger than the transport air flow cross-sectional area of the second conduit.

15. A climate system according to claim 1, wherein the first heat exchanger is located at the outlet end of the first conduit.

16. A climate system according to claim 1, wherein the climate system comprises a second conduit, an outlet end of the second conduit being adapted to be arranged inside of the cab, an inlet end of the second conduit being connected to the pressurized air source or the first conduit so as for the second conduit to supply compressed air into the cab, the climate system comprising a second heat exchanger arranged so as for heat to be exchanged between the air supplied by the second conduit into the cab, and the fluid in the first fluid circuit or a fluid in a second fluid circuit of the climate system.

17. A climate system according to claim 1, wherein the climate system comprises a heat source, the climate system being arranged so as for heat to be exchanged between the fluid in the first fluid circuit and the heat source.

18. A climate system according to claim 1, wherein the climate system comprises a valve arrangement and also a heat source and an air conditioning circuit, the valve arrangement being arranged so as for the fluid in the first fluid circuit to be selectively directed to the heat source and to the air conditioning circuit.

19. An arrangement comprising a climate system according to claim 1 and a cab, the outlet end of the first conduit being located inside the cab.

20. A climate system for providing air to a cab of a vehicle, the climate system comprising a first conduit, an outlet end of the first conduit being adapted to be arranged inside of the cab, wherein the climate system comprises a pressurized air source, an inlet end of the first conduit being connected to the pressurized air source for supplying compressed air into the cab by means of the first conduit,
wherein the climate system comprises a first fluid circuit and a first heat exchanger arranged so as for heat to be exchanged between the air supplied by the first conduit from the pressurized air source into the cab, and a fluid in the first fluid circuit, and
wherein the climate system comprises a further heat exchanger and also a heat source and/or an air conditioning circuit, the further heat exchanger being arranged so as for heat to be exchanged between on one hand the fluid in the first fluid circuit and on the other hand a fluid in a further circuit connected to the heat source and/or a fluid in the air conditioning circuit.

21. A climate system for providing air to a cab of a vehicle, the climate system comprising a first conduit, an outlet end of the first conduit being adapted to be arranged inside of the cab, wherein the climate system comprises a pressurized air source, an inlet end of the first conduit being connected to the pressurized air source for supplying compressed air into the cab by means of the first conduit,
wherein the climate system comprises a first fluid circuit and a first heat exchanger arranged so as for heat to be exchanged between the air supplied by the first conduit from the pressurized air source into the cab, and a fluid in the first fluid circuit, and
wherein the climate system comprises an air conditioning circuit, the climate system being arranged so as for heat to be exchanged between the fluid in the first fluid circuit and the air conditioning circuit.

* * * * *